(12) United States Patent
Herau et al.

(10) Patent No.: US 10,577,072 B2
(45) Date of Patent: Mar. 3, 2020

(54) CONNECTING MECHANISM BETWEEN AN AIRCRAFT DOOR AND A STRUCTURE OF THE AIRCRAFT, RELATED AIRCRAFT AND METHOD

(71) Applicant: DASSAULT AVIATION, Paris (FR)

(72) Inventors: Pascal Herau, Ger (FR); Guillaume Dedieu, Tarbes (FR)

(73) Assignee: DASSAULT AVIATION, Paris (FR)

( * ) Notice: Subject to any disclaimer, the term of this patent is extended or adjusted under 35 U.S.C. 154(b) by 399 days.

(21) Appl. No.: 15/458,710

(22) Filed: Mar. 14, 2017

(65) Prior Publication Data

US 2017/0267327 A1 Sep. 21, 2017

(30) Foreign Application Priority Data

Mar. 16, 2016 (FR) ..................... 16 00432

(51) Int. Cl.
| | | |
|---|---|---|
| *B64C 1/14* | (2006.01) | |
| *F16D 11/14* | (2006.01) | |
| *F16D 63/00* | (2006.01) | |
| *F16D 3/207* | (2006.01) | |

(52) U.S. Cl.
CPC ............. *B64C 1/1407* (2013.01); *B64C 1/14* (2013.01); *B64C 1/143* (2013.01); *B64C 1/1415* (2013.01); *B64C 1/1423* (2013.01); *F16D 3/207* (2013.01); *F16D 11/14* (2013.01); *F16D 63/006* (2013.01); *E05Y 2900/502* (2013.01)

(58) Field of Classification Search
CPC ....... B64C 1/1407; B64C 1/14; B64C 1/1415; B64C 1/1423; B64C 1/143; F16D 3/207; F16D 11/14; F16D 63/006; E05Y 2900/502

USPC ....................................... 244/129.5
See application file for complete search history.

(56) References Cited

U.S. PATENT DOCUMENTS

| | | | | |
|---|---|---|---|---|
| 5,305,969 A | * | 4/1994 | Odell | B64C 1/1407 244/129.5 |
| 5,636,814 A | * | 6/1997 | Rollert | B64C 1/1407 192/71 |
| 6,834,834 B2 | | 12/2004 | Dazet et al. | |
| 2002/0139897 A1 | | 10/2002 | Erben et al. | |
| 2009/0113954 A1 | * | 5/2009 | De Resseguier | B64C 1/14 70/91 |

FOREIGN PATENT DOCUMENTS

GB 868 390 A 5/1961

OTHER PUBLICATIONS

Search Report of French priority application.

* cited by examiner

*Primary Examiner* — Samir Abdosh
(74) *Attorney, Agent, or Firm* — Davidson, Davidson & Kappel, LLC

(57) ABSTRACT

A connecting mechanism between an aircraft door and a structure of the aircraft, a related aircraft and method are provided. The connecting mechanism includes an arm intended to be hinged on to the structure, a rotating connection between the door and the arm. The rotating connection may be disengaged from a connection configuration for connecting the door with the arm in an open position of the door, into an uncoupling configuration for uncoupling of the door from the arm, in a closed door position of the door.

16 Claims, 4 Drawing Sheets

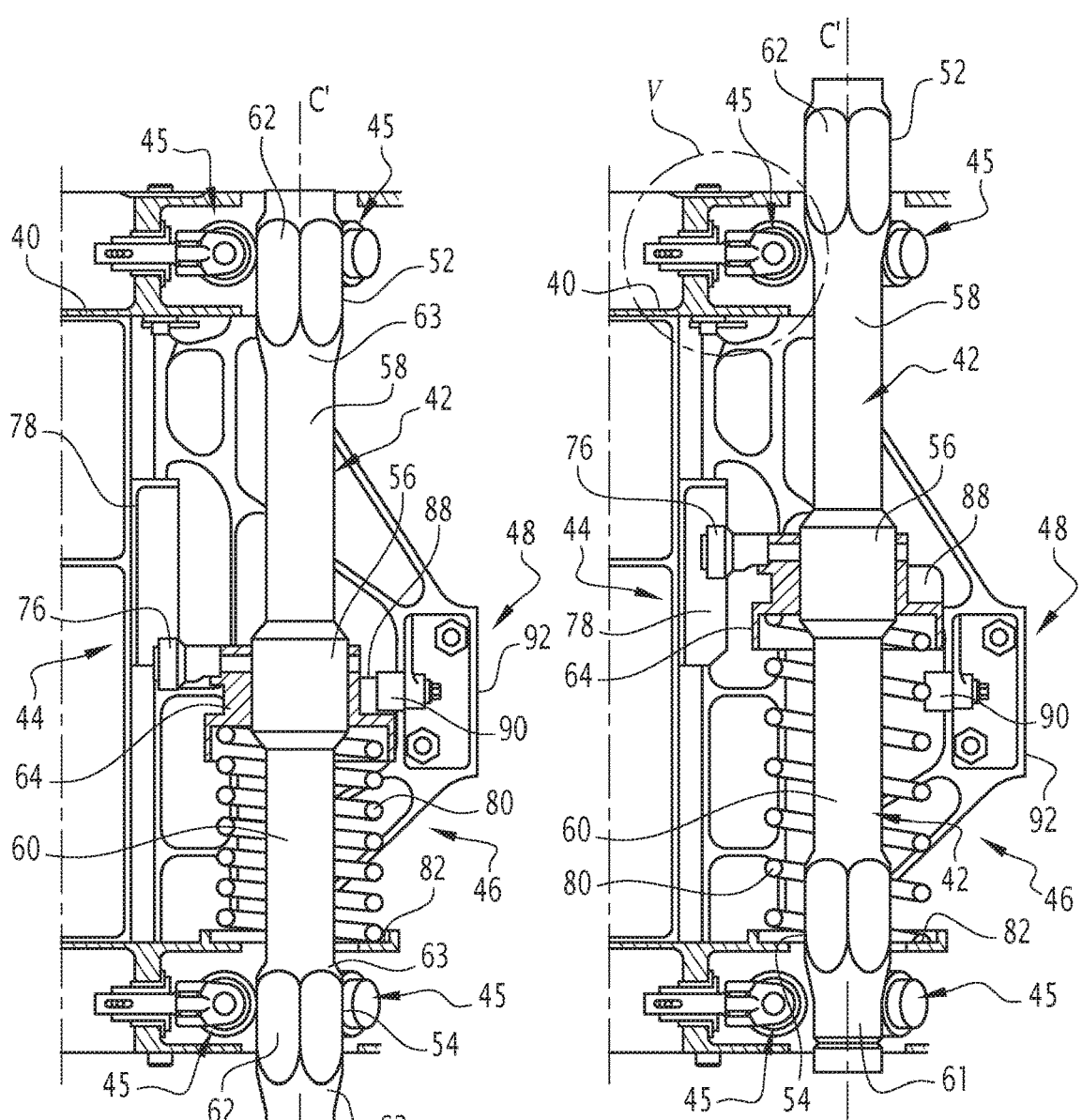
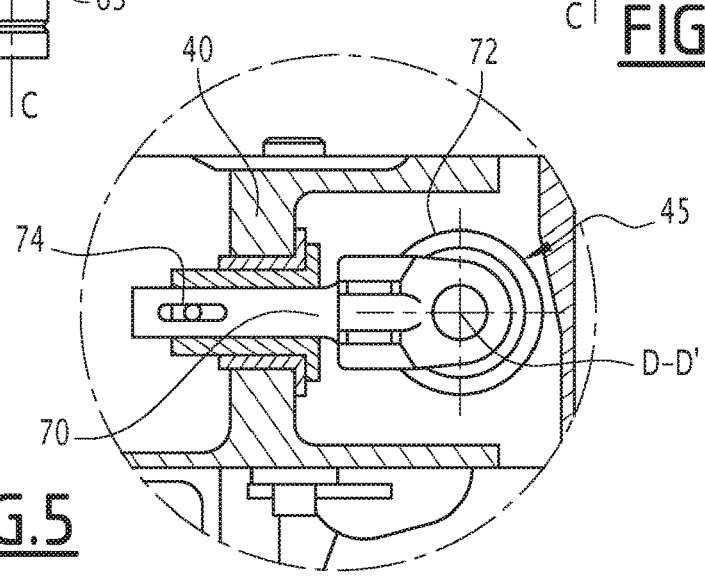

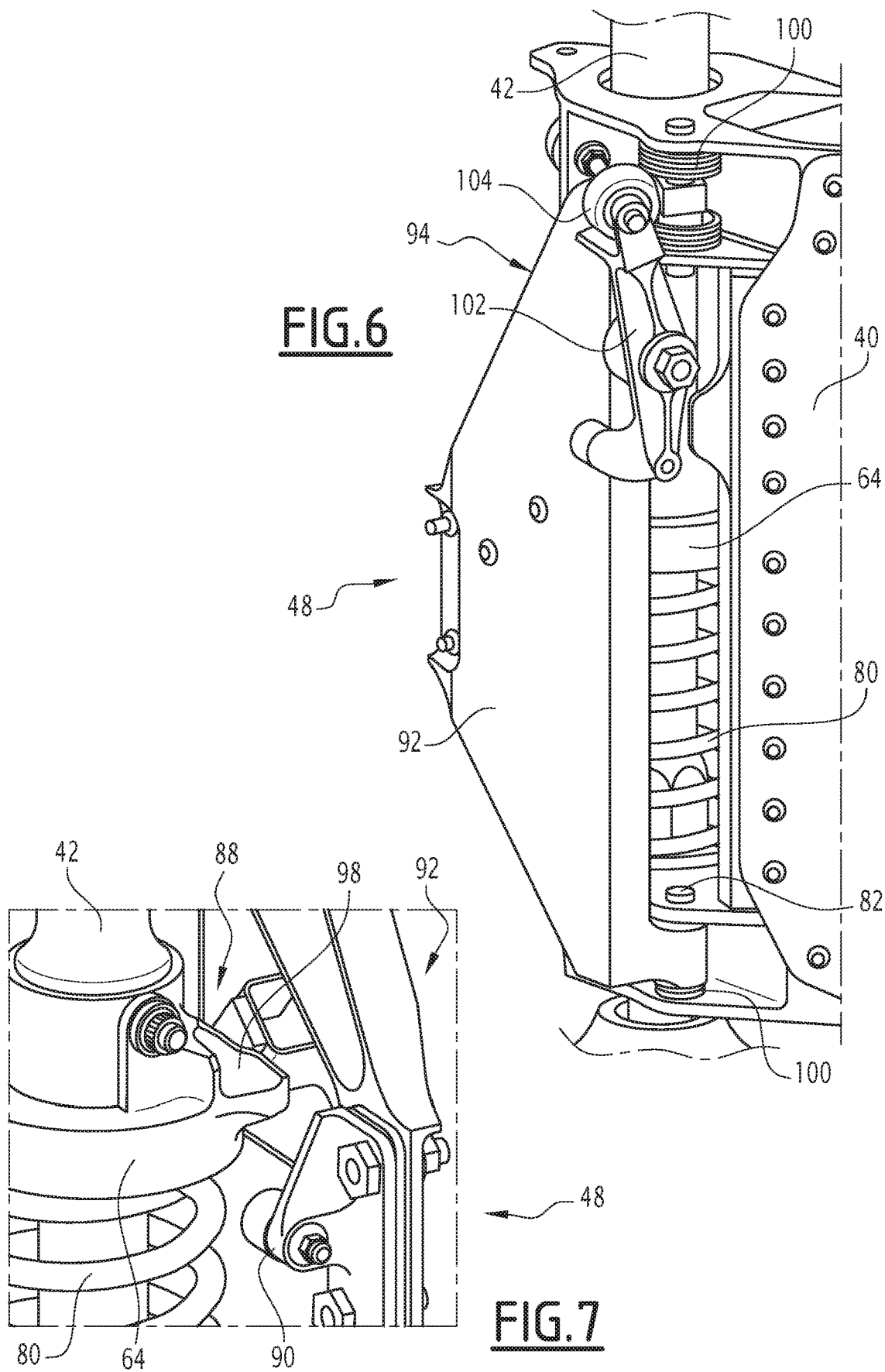

CONNECTING MECHANISM BETWEEN AN AIRCRAFT DOOR AND A STRUCTURE OF THE AIRCRAFT, RELATED AIRCRAFT AND METHOD

This claims the benefit of French Patent Application FR 16 00432, filed Mar. 16, 2016 and hereby incorporated by reference herein.

The present invention relates to a connecting mechanism between an aircraft door and a structure of the aircraft comprising:
an arm intended to be hinged on to the structure;
a rotating connection between the door and the arm.

Such a mechanism is intended to be interposed in particular between the framework of the aircraft and a door intended to close off an opening provided in the fuselage.

The opening is for example an access opening for access to the cabin, an access opening for access to a baggage hold or/and an access opening for access to a technical area of the aircraft.

In a general manner, the cabin of an aircraft is pressurised. The structure of the aircraft, in particular its framework, is thus subject to constraints with respect to torsion, flexion and function in accordance with the different configurations that it occupies on the ground and in flight.

The doors that close off the openings mentioned above, in particular the access doors to the cabin and the baggage hold doors are also subject to pressurisation.

BACKGROUND

Generally, the doors are connected to the structure of the aircraft by an articulatedly jointed arm and/or hinges. In order for a door to retain its function as sealing lid for the pressurisation of the cabin, it is necessary for it to not be subject to the torsion and flexion constraints that are applied on to the framework of the aircraft. This requires a decoupling of the door from the arm once the door is closed.

Moreover, the connection between the door and the arm must be robust in order to make possible the precise installing in position of the door at the level of the opening, in the door frame located around the opening. The connecting mechanism must therefore present a sufficient degree of stiffness, particularly at the level of the connection between the arm and the door in order to ensure the proper installing in position thereof.

In the aforementioned type of mechanisms, the arm is joined in an articulated manner on to the framework of the aircraft. The aircraft door is also joined in an articulated manner on to the free edge of the arm. This allows for the installing in position of the door in its frame.

In addition, the door is often movable in translational motion in relation to the arm in order to make possible the passage of the door behind the pressurising stoppers, in the case of fixed stoppers.

In one mechanism that is known, the arm is equipped at one end thereof with a deformable parallelogram providing for guidance in the phase of docking or retraction of the pressurising stoppers.

The requirement of precise guidance of the door, however, is contradictory with the need to decouple the door from/of the connecting mechanism once the door is closed.

In order to overcome this problem, the decoupling is brought about for example by means of deformable elastomer elements that are disposed either at the level of the pivot connections between the arm and the door, or interposed between the door and its guiding support members.

SUMMARY OF THE INVENTION

Such a solution does not provide complete satisfaction. The insertion of the elastomer elements produces a loss of precision in guidance in the phase of opening or closing of the door. In addition, the transmission of mechanical actions between the door and the framework of the aircraft is not entirely removed. This residual transmission moreover varies also according to the temperature and pressure, in particular when an elastomer damper is used, since the elastomer hardens at low temperatures.

An objective of the invention is therefore to provide a connecting mechanism between an aircraft door and a structure of the aircraft that makes possible the precise guidance of the door, in particular in the phase of opening or closing thereof, while also minimising the transmission of mechanical actions between the framework of the aircraft and the door when the door is closed.

To this end, a mechanism of the aforementioned type is provided, characterised in that the rotating connection may be disengaged from a connection configuration for connecting the door with the arm in an open position of the door, into an uncoupling configuration for uncoupling of the door from the arm, in a closed door position of the door.

The mechanism according to the invention may include one or more of the following characteristic features taken in consideration in isolation or in accordance with any technically possible combination:
the rotating connection includes a movable shaft that is movable in translational motion in relation to the arm along an axis of movement between a first connected position connected to the arm in the connection configuration and a second released position released from the arm in the uncoupling configuration;
the rotating connection includes at least one support member fixed on to the arm, the shaft defining at least one region of cooperation for cooperating with the support member, the support member being applied on to the region of cooperation in the first position, the support member being entirely disposed apart from the shaft in the second position;
the shaft comprises at least one narrowed region adjacent to the cooperation region, the support member being disposed so as to face the narrowed region, apart from the latter in the second position;
the support member includes a rotating roller capable of rolling over the region of cooperation during the movement of the shaft from the first position to the second position;
it includes at least one locking stop for locking the shaft in the first position, the shaft defining a track for cooperating with the stop, the stop being engaged on to the track in the connection configuration and being disengaged from the track in the uncoupling configuration;
it includes a disengagement control member for controlling the disengaging of the stop out of the track, that is capable of cooperating with the door during the passing of the door from the open position to the closed position;
the track defines a blocking tab lug for lateral blocking of the stop, which cooperates with the stop when the stop is engaged on to the track;

it includes a stop support mounted so as to be pivotable on the arm around an axis that is parallel to the axis of movement of the shaft;

it includes a resilient biasing member for resiliently biasing the shaft to the second position;

it includes a first ball-joint connection between the shaft and the door and a second ball-joint connection between the shaft and the door, the ball-joint connections being arranged at the axial ends of the shaft;

it includes an angular indexation assembly for angular indexing of the shaft in relation to the arm;

An aircraft is also provided including:

a structure defining at least one opening;

a door for closing off the opening, that is mounted to be movable in relation to the structure between an open position and a closed position; and a mechanism as defined here above, with the arm being mounted so as to be rotating over the structure, the door being connected to the arm by means of the rotating connection.

A method is also provided for operating an aircraft door including the following steps:

providing an aircraft as defined here above, with the door being in the open position;

moving of the door to the closed position, by rotating the arm in relation to the structure and/or rotating the door in relation to the arm, with the rotating connection being in its connection configuration;

disengaging of the rotating connection in order for it to pass into its uncoupling configuration.

The method according to the invention may include the following feature:

the disengaging of the rotating connection includes the moving in translational motion of the door in relation to the arm.

BRIEF SUMMARY OF THE DRAWINGS

The invention will be better understood upon reading the description that follows, which is provided only by way of an example, and made with reference to the drawings attached, in which:

FIG. 3 is a view of the rotating connection assembly between the arm and the door, in a connection configuration for connecting the door with the arm, when the door is opened;

FIG. 4 is a view that is analogous to that in FIG. 3, in an uncoupling configuration for uncoupling of the door from the arm, when the door is closed;

FIG. 5 is a view of a detail marked V on FIG. 4;

FIG. 6 is a perspective side view of the rotating connection assembly, illustrating the locking elements for locking the rotating connection assembly in the connection configuration for connecting the door with the arm;

FIG. 7 is a perspective view of a detail of the locking elements for locking the rotating connection assembly in the connection configuration.

DETAILED DESCRIPTION

Figure 1:
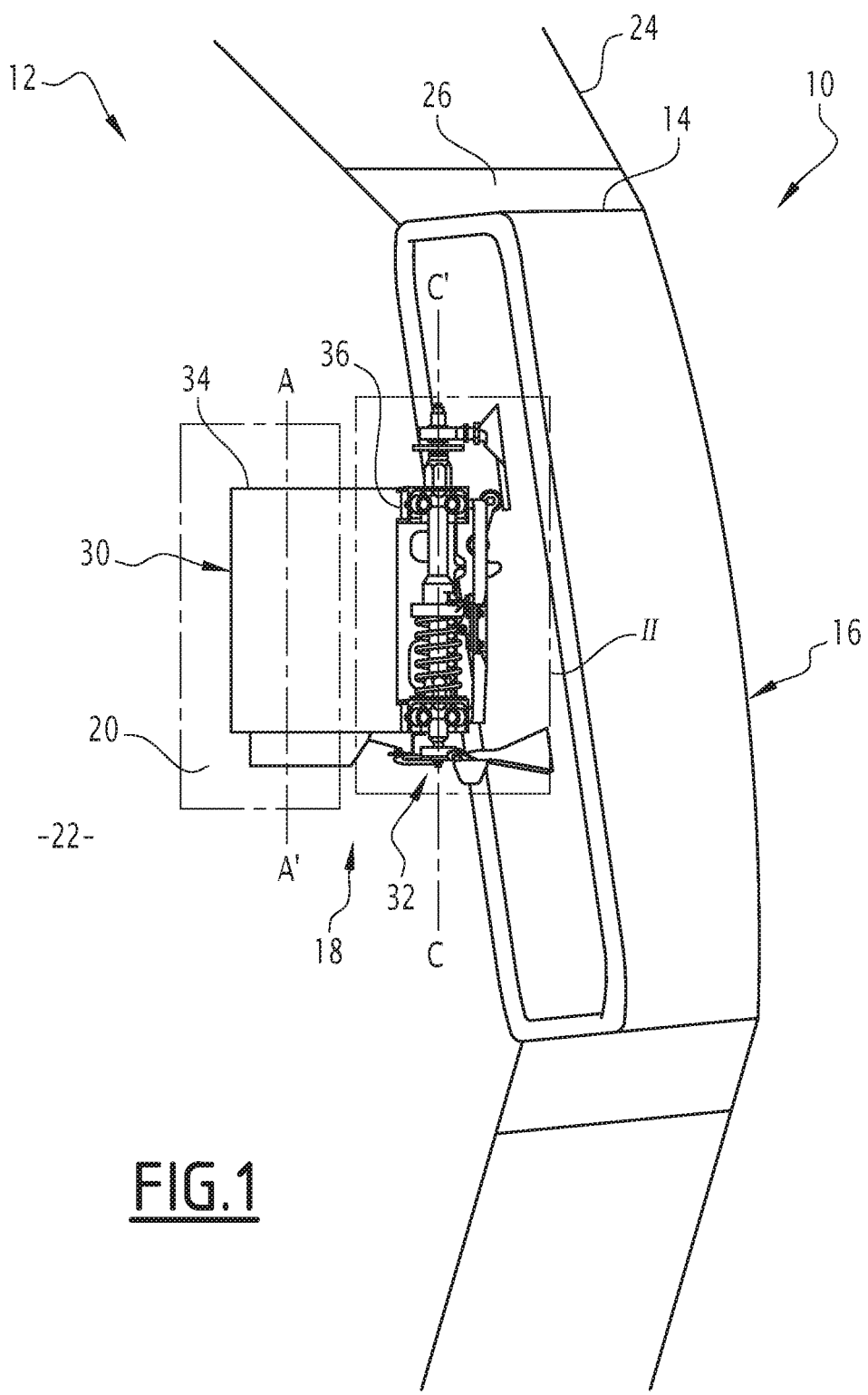
FIG. 1 is a view partially in perspective illustrating a door of an aircraft according to an embodiment of the invention and its connecting mechanism for connecting on to the structure of the aircraft.

A first aircraft 10 according to an embodiment of the invention is partially illustrated in FIG. 1. The aircraft 10 comprises a structure 12 that defines at least one opening 14, and a door 16, which is movable between an open position for access to the opening 14 and a closed position for closing off the opening 14.

The aircraft 10 additionally also includes a connecting mechanism 18 between the door 16 and the structure 12 for ensuring connection there-between, a door operation mechanism (not represented) for operating and manipulation of the door between its open position and its closed position and a locking mechanism (not represented) for locking the door 16 in its closed position.

In a known manner the structure 12 comprises an internal framework 20 that defines an interior volume 22 and an exterior skin 24 through which is provided the opening 14.

The interior volume 22 is for example a cabin of the aircraft intended for accommodating the occupants of the aircraft, including the flight crew and/or the passengers, a baggage hold intended for accommodating the baggage and/or freight, or a technical compartment intended for accommodating the equipment to be used for the operation of the aircraft 10.

The opening 14, when it is clear and unobstructed, provides the ability to access the interior volume 22 from the exterior of the aircraft 10.

The outer skin 24 includes a frame 26 arranged at the periphery of the opening 14, that is intended for accommodating the door 16 in its closed position. The frame 26 includes for example pressurisation stops (not represented).

The door 26 is formed by a panel that completely closes off the opening 14 in the closed position.

From the closed position shown in FIG. 1, and as it will be seen farther below, the door 26 is movable in vertical translational motion between the closed position and an intermediate open position, in order to disengage itself from the pressurising stoppers. Thereafter, it is movable in horizontal translational motion and in rotation around a vertical axis from the intermediate open position up to the open position by means of the connecting mechanism 18.

Figure 2:
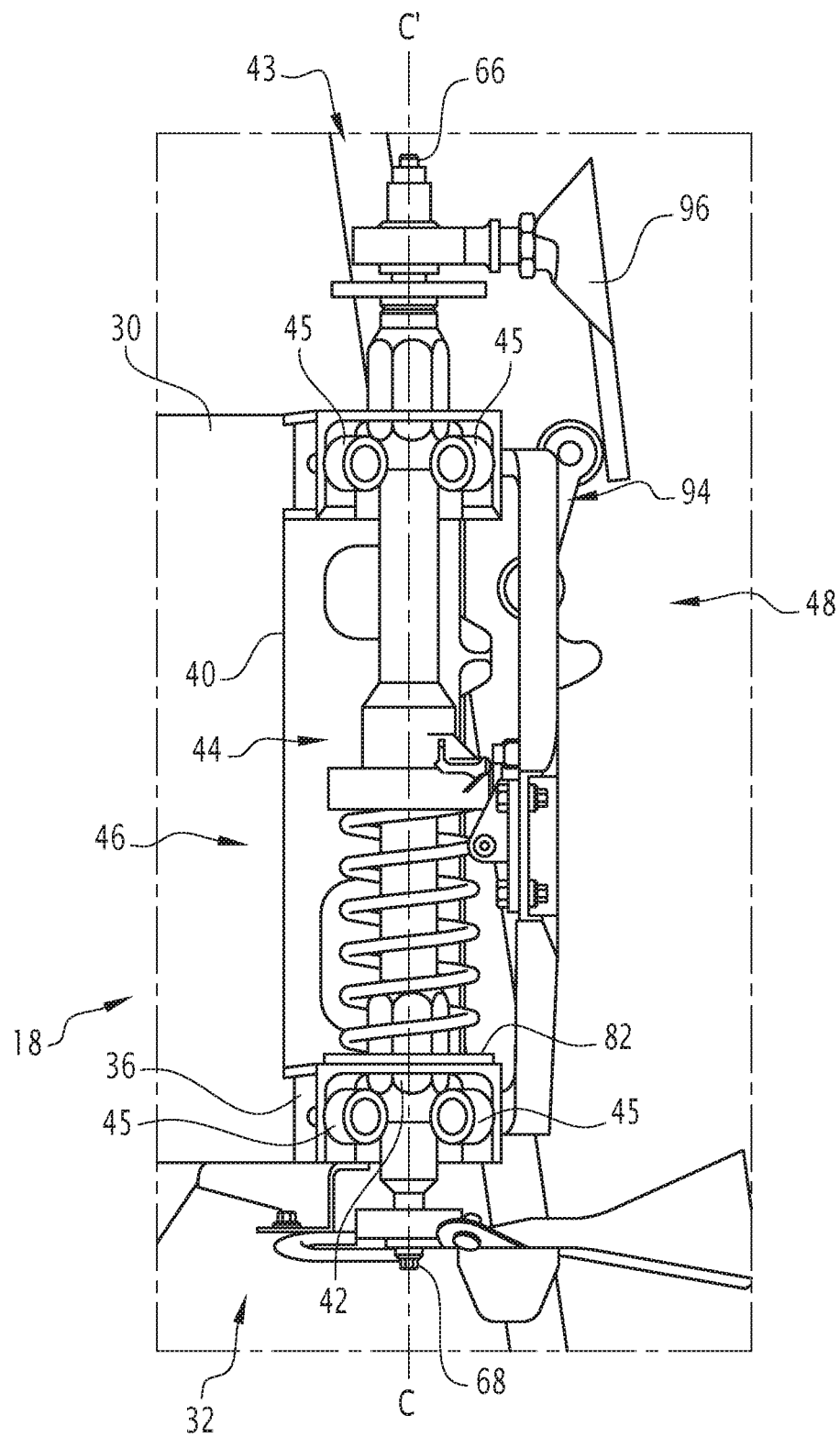
FIG. 2 is an enlarged view of a detail marked II in the FIG. 1 illustrating the connecting mechanism shown in FIG. 1.

With reference to FIGS. 1 and 2, the connecting mechanism 18 includes a connecting arm 30 mounted in a rotating manner on to the structure 12, and a rotating connection assembly 32 for rotatably connecting with the door 16, which may be disengaged from a connection configuration for connecting the door 16 with the arm 30, visible in FIG. 4, into an uncoupling configuration for uncoupling of the door 16 from the arm 30.

In a known manner the arm 30 has a curved form shaped like a T. It presents an interior edge 34 mounted so as to be pivotable on the structure 12 around a vertical axis A-A' and an exterior edge 36 on which is mounted the rotating connection assembly 32.

With reference to FIG. 2, the rotating connection assembly 32 comprises a support frame 40 that is mounted to be fixed on the exterior edge 36 of the arm 30, a shaft 42 that is mounted to be movable in translational motion in relation to the arm 30 along an axis C-C' of movement that is parallel to the axis of rotation of the arm 30 and of the connection elements 43 for connecting the shaft 42 to the door 16.

The rotating connection assembly 32 additionally also includes at least one support member 45 on the shaft, 42, an indexation assembly 44 for indexing the shaft 42 in relation to the arm 30, a resilient biasing element 46 for resiliently biasing the shaft 42, and selective locking elements 48 for selectively locking the shaft 42.

With reference to the FIGS. 3 and 4, the shaft 42 extends along its axis C-C' of movement in translational motion. It is movable in translational motion between a first connected position connected to the arm 30, illustrated in FIG. 3 and a second released position released from the arm 30, illustrated in FIG. 4.

The shaft 42 includes at least one region of cooperation 52, 54 for cooperating with a support member 45, at least one central region of cooperation 56 for cooperating with the locking elements 48 and at least one narrowed release region 58, 60, 61 for releasing of the shaft 42.

In this example, the shaft 42 comprises an upper region of cooperation 52 and a lower region of cooperation 54 respectively located in the vicinity of its ends. It includes a first narrowed region 58 located between the upper region 52 and the central region 56, a second narrowed region 60, located between the central region 56 and the lower region 54 and a third narrowed region 61 located under the region of cooperation 54.

The maximum transverse extension of each region of cooperation 52, 54 is greater than the maximum transverse extension of each narrowed region 58, 60, 61.

Each region of cooperation 52, 54 has a cooperation surface 62 for cooperating with a support member 45. In this example, the cooperation surfaces 62 are formed by flat sections. They are spread angularly around the axis C-C'.

The central region 56 has a collar flange 64. The maximum transverse extension of the collar flange 64 is greater than that of each region of cooperation 52, 54.

Advantageously, each narrowed region 58, 60, 61 presents a continuous transition 63 of transverse extension increasing with each region of cooperation 52, 54.

With reference to FIG. 2, the connection elements 43 include a ball-joint connection 66, 68 between the door 16 and each end of the shaft 42.

In the example shown in the figures, the rotating connection assembly 32 comprises a plurality of support members 45.

It includes in particular a group of support members 45 associated respectively to each region of cooperation 52, 54. 32. The assembly thus preferably includes at least a first group of support members 45 intended for cooperating with the upper region of cooperation 52 and at least a second group of support members 45 intended for cooperating with the lower region 54.

In this example, the support members 45 extend radially towards the axis of movement C-C'. As illustrated in FIG. 5, each support member 45 comprises a rotating roller 72 around a horizontal axis D-D' that is perpendicular to the axis of movement C-C'.

Each support member 45 is capable of coming to bear upon a surface of cooperation 62 of an region of cooperation 52, 54 in the first position illustrated in FIG. 3, in order to immobilize shaft the 42 transversely relative to the axis C-C' in relation to the arm 30. Thus, the connection between the door 16 and the arm 30 is made rigid.

Each support member 45 is capable of being arranged so as to face a narrowed region 58, 61, apart from the shaft 42 in the second position illustrated in FIG. 4, in order to dislodge the shaft 42 from the arm 30, thus avoiding the transmission of movements between the arm 30 and the door 16

Advantageously, as illustrated by FIG. 5, the radial position of at least one support member 45 of each group of support members 45 is adjustable by means of an adjustment mechanism 74 in order to control and adjust the strength of rigidification of the shaft 30 in relation to arm 42. To this end, the support member 45 includes a support 70 mounted to be movable on the frame 40 by means of the adjustment mechanism 74, the rotating roller 72 being mounted to be rotational on the support 70 around the axis D-D'.

The indexing assembly 44 is capable of immobilizing the shaft 42 in rotation around its axis of movement C-C'. With reference to FIG. 3, it includes for example a roller 76 that is movable jointly with the shaft 42 and a slide 78 that is integrally attached to the frame 40 that receives the roller 76.

The resilient biasing member 46 is designed to continuously bias the shaft 42 to the second position. For example, it includes a helical coil spring 80.

The resilient biasing member 46 is for example longitudinally interposed between the central region 56 and a fixed seat 82 that is integrally attached to the frame 40. It extends around the shaft 42.

The resilient biasing member 46 is capable of developing a force directed towards the top so as to compensate for the mass of the door 16 and thus reduce the manoeuvring efforts required.

The locking elements 48 are capable of immobilizing the shaft 42 in translational motion along the axis of movement C-C' in the first position, in the connection configuration for connecting the door 16 with the arm 30, against the resilient biasing member 46.

The locking elements 48 include a track 88 that is integrally attached to the shaft 42, a movable stop 90 able to be inserted in the track 88, and a stop support 92 joined in articulated manner on to the arm 30 around an axis that is parallel to the axis of movement C-C'.

With reference to FIG. 2, the locking elements 48 include in addition a controller in the form of a control member 94 for controlling the movement of the stop 90, capable of being actuated by the door 16, and a path of cooperation 96 for cooperating with the control member 94, that is integrally attached to the door 16.

As illustrated in FIG. 7, the track 88 is formed by a substantially circumferential groove arranged on the periphery of the collar flange 64. The track 88 is delimited towards the exterior by a tab lug 98 forming the edge, providing for the lateral locking of the stop 90.

The stop 90 here comprises a roller capable of being inserted into the groove. It is mounted to be fixed on one surface of the stop support 92 located to be facing the shaft 42.

The stop support 92 here includes a plate arranged to be parallel to the shaft 42. The stop support 92 is joined in an articulated manner on the axes that are parallel to the axis of movement C-C' provided with resilient biasing springs.

Thus, the stop support 92 and the stop 90 are movable by pivoting motion around an axis that is parallel to the axis of movement C-C' between a resting position located in the vicinity of the shaft 42, as visible in FIG. 6, and an extended position away from the shaft 42, allowing for the passing of the shaft 42 from the first position to the second position.

The control member 94 comprises a bar 102 joined in an articulated manner to the rear of the stop support 92 on a surface opposite the surface that carries the stop 90. The bar 102 presents at a first end a roller 104, capable of cooperating with the path 96 present on the door 16 in order to move away the support 92 and the stop 90 from the shaft 42 during the moving of the door 16 from the intermediate position to the closed position, and of bringing them close to the shaft 42 in the closed position, as in the open position of door 16.

The operation of the connecting mechanism 18, during the closing of a door 16 of the aircraft 10 will now be described.

Initially, the door 16 is in its fully open position. In this position, the rotating connection assembly 32 is in its connection configuration for connecting the door 16 and the arm 30.

In this configuration, as illustrated in FIG. 3, the shaft 42 is in its first position. Each region of cooperation 52, 54 is arranged to be facing a group of support members 45. The rollers 72 of the support members 45 come to bear against the surfaces of cooperation 62 and laterally immobilise the shaft 42, while keeping it centred on its axis of movement C-C'.

The indexing assembly 44 blocks the rotation of the shaft 42 around its axis of movement C-C'.

The resilient biasing member 46 is compressed. The control member 94 is located apart from the door 16. The support 92 and the stop 90 are thus then in the position close to the shaft 42. The stop 90 is then inserted into the track 88 and blocks the shaft 42 in translational motion along its axis of movement C-C'. It is retained laterally in the track 88 by the tab lug 98.

The mechanical connection between the door 16 and the arm 30 is thus made rigid. This connection remains pivoting by making use of the ball-joint connection 66, 68 that makes possible an angular displacement of the door 16 in order to release the opening 14.

Similarly, the arm 30 is free to pivot relative to the structure 12 about the vertical axis A-A' passing through its interior edge 34.

When the door 16 is to be closed, the arm 30 and the door 16 are pivoted by means of the manoeuvring mechanism (not represented) in order to move the door 16 close to the door frame 26 and insert it into the door frame 26.

When the door 16 comes into contact with the door frame 26, it is in its intermediate position. In this position, the roller 104 of the control member 94 comes in contact with the path 96 on the door 16 thereby causing the moving of the support 92 and the stop 90 away from the shaft 42 and the release of the stop 90 out of the track 88.

The vertical movement in order to release the stop 90 from the track 88 is induced by the manoeuvring mechanism.

Then, the door 16 is moved in translational motion in the upward direction by the locking mechanism (not represented) in order to be fixed in the door frame 26, in particular behind the pressurising stoppers. It is in its closed position in which it closes off the opening 14.

During this move, the shaft 42 rises up to the second position while being aided by the resilient biasing member 46 compensating at least partially for the weight of the door 16. Each support member 45 then passes in front of a narrowed region 58, 61 by being positioned entirely apart from the shaft 42.

The support 92 and the stop 90 then switch again to their close-in position close to the shaft 42 and the stop 90 is placed under the collar flange 64.

The shaft 42 is completely dislodged from the arm 30. A clearance that is greater than the relative displacement between the door 16 and the arm 30 in all cases of ground and flight load is created between the shaft 42 and the support members 45.

Thus, the rotating connection assembly 32 is in its uncoupling configuration for uncoupling of the door 16 from the arm 30, in which the mechanical connection between the arm 30 and the door 16 is broken.

In order to reopen the door 16, the preceding steps are carried out in reverse by moving the door in translational motion from its closed position to its intermediate position, which causes the rotating connection assembly to pass from the uncoupling configuration into the connection configuration, then by pivoting and moving away the door 16 and the arm 30 so as to reach the open position.

The mechanical decoupling of the door 16 from the arm 30 is thus achieved in totality in the closed position of the door 16, without there being any need to insert elastomer elements between the door 16 and the internal framework 20, or at the level of the rotating connection assembly 32. This mechanical decoupling no longer depends on the temperature, especially in flight. The loads, the movements and vibrations are not transmitted from the framework 20 to the door 16.

This beneficial effect is achieved without degrading the mechanical guide between the arm 30 and the door 16, when the door 16 is in its open position. On the contrary, this guide is stiffened and strengthened by the presence of support members 45 cooperating with the shaft 42.

The connecting mechanism 18 additionally is also compact and combines the functions of rigidifying and decoupling.

The presence of a resilient biasing member 46 moreover also ensures compensation for mass facilitating the manoeuvre and operation of the door 16 from its intermediate position of insertion in the door frame 26 to its closed position.

What is claimed is:

1. A connecting mechanism between an aircraft door and a structure of the aircraft comprising:
    an arm configured to be hinged on to the structure; and
    a rotating connection between the door and the arm, the rotating connection being configured to be disengaged from a connection configuration for connecting the door with the arm in an open position of the door, into an uncoupling configuration for uncoupling of the door from the arm, in a closed door position of the door,
    the arm including an interior edge configured to be mounted pivotable on the structure around an axis and an exterior edge on which is mounted the rotating connection.

2. The mechanism according to claim 1, wherein the rotating connection includes a movable shaft that is movable in translational motion in relation to the arm along an axis of movement between a first connected position connected to the arm in the connection configuration and a second released position released from the arm in the uncoupling configuration.

3. The mechanism according to claim 2, wherein the rotating connection includes at least one support fixed onto the arm, the shaft defining at least one region of cooperation for cooperating with the support, the support being applied onto the region of cooperation in the first position, the support being entirely disposed apart from the shaft in the second position.

4. The mechanism according to claim 3, wherein the shaft comprises at least one narrowed region adjacent to the cooperation region, the support being disposed so as to face the narrowed region, apart from the narrowed region in the second position.

5. The mechanism according to claim 3, wherein the support includes a rotating roller configured for rolling over the region of cooperation during the movement of the shaft from the first position to the second position.

6. The mechanism according to claim 2, further comprising at least one locking stop for locking the shaft in the first position, the shaft defining a track for cooperating with the stop, with the stop being engaged on to the track in the connection configuration and being disengaged from the track in the uncoupling configuration.

7. The mechanism according to claim 6, further comprising a disengagement controller for controlling the disengaging of the stop out of the track, the disengagement controller being configured to cooperate with the door during the passing of the door from the open position to the closed position.

8. The mechanism according to claim 6, wherein the track defines a blocking tab lug for lateral blocking of the stop, the track being configured to cooperate with the stop when the stop is engaged on to the track.

9. The mechanism according to claim 6, further comprising a stop support mounted so as to be pivotable on the arm around an axis parallel to the axis of movement of the shaft.

10. The mechanism according to claim 2, further comprising a resilient biaser for resiliently biasing the shaft to the second position.

11. The mechanism according to claim 2, further comprising a first ball-joint connection between the shaft and the door and a second ball-joint connection between the shaft and the door, the first and second ball-joint connections being arranged at respective axial ends of the shaft.

12. The mechanism according to claim 2, further comprising an angular indexer for angular indexing of the shaft in relation to the arm.

13. An aircraft comprising:
a structure defining at least one opening;
a door for closing off the opening, the door being mounted to be movable in relation to the structure between an open position and a closed position; and
the mechanism according to claim 1, the arm being mounted so as to be rotating over the structure, the door being connected to the arm by the rotating connection.

14. A method for operating an aircraft door comprising:
providing the aircraft according to claim 13, the door being in the open position;
moving of the door to the closed position, by rotating the arm in relation to the structure and/or rotating the door in relation to the arm, with the rotating connection being in the connection configuration; and
disengaging of the rotating connection in order for it to pass into its uncoupling configuration.

15. The method according to claim 14, wherein the disengaging of the rotating connection includes the moving in translational motion of the door in relation to the arm.

16. A connecting mechanism between an aircraft door and a structure of the aircraft comprising:
an arm configured to be hinged on to the structure; and
a rotating connection between the door and the arm, the rotating connection being configured to be disengaged from a connection configuration for connecting the door with the arm in an open position of the door, into an uncoupling configuration for uncoupling of the door from the arm, in a closed door position of the door,
wherein the rotating connection includes a movable shaft that is movable in translational motion in relation to the arm along an axis of movement between a first connected position connected to the arm in the connection configuration and a second released position released from the arm in the uncoupling configuration.

* * * * *